July 26, 1960 A. D. F. MONCRIEFF 2,946,264
LOADING MECHANISM
Filed Nov. 21, 1955 3 Sheets-Sheet 1
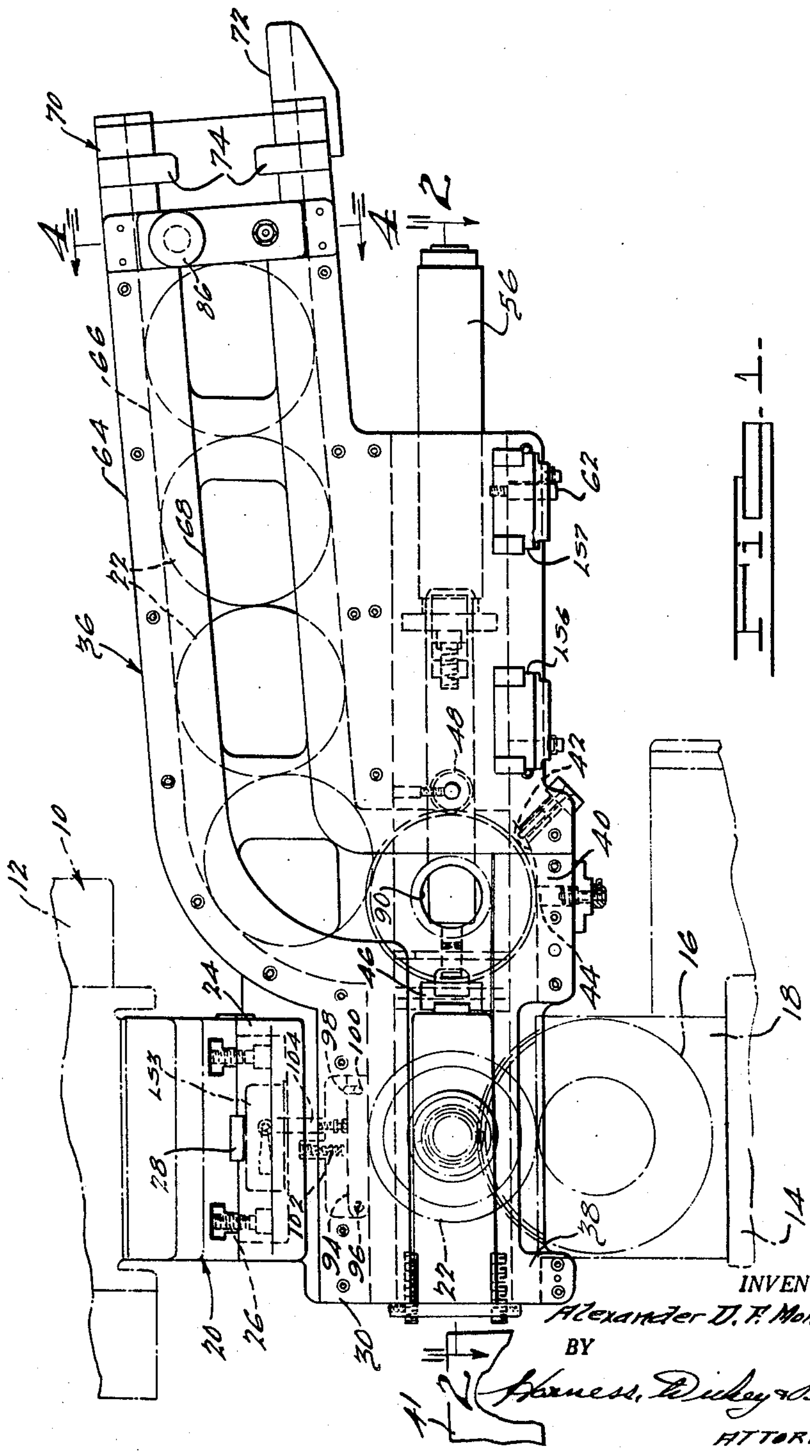
INVENTOR.
Alexander D. F. Moncrieff
BY
Harness, Dickey & Pierce
ATTORNEYS.

July 26, 1960 A. D. F. MONCRIEFF 2,946,264
LOADING MECHANISM
Filed Nov. 21, 1955 3 Sheets-Sheet 2
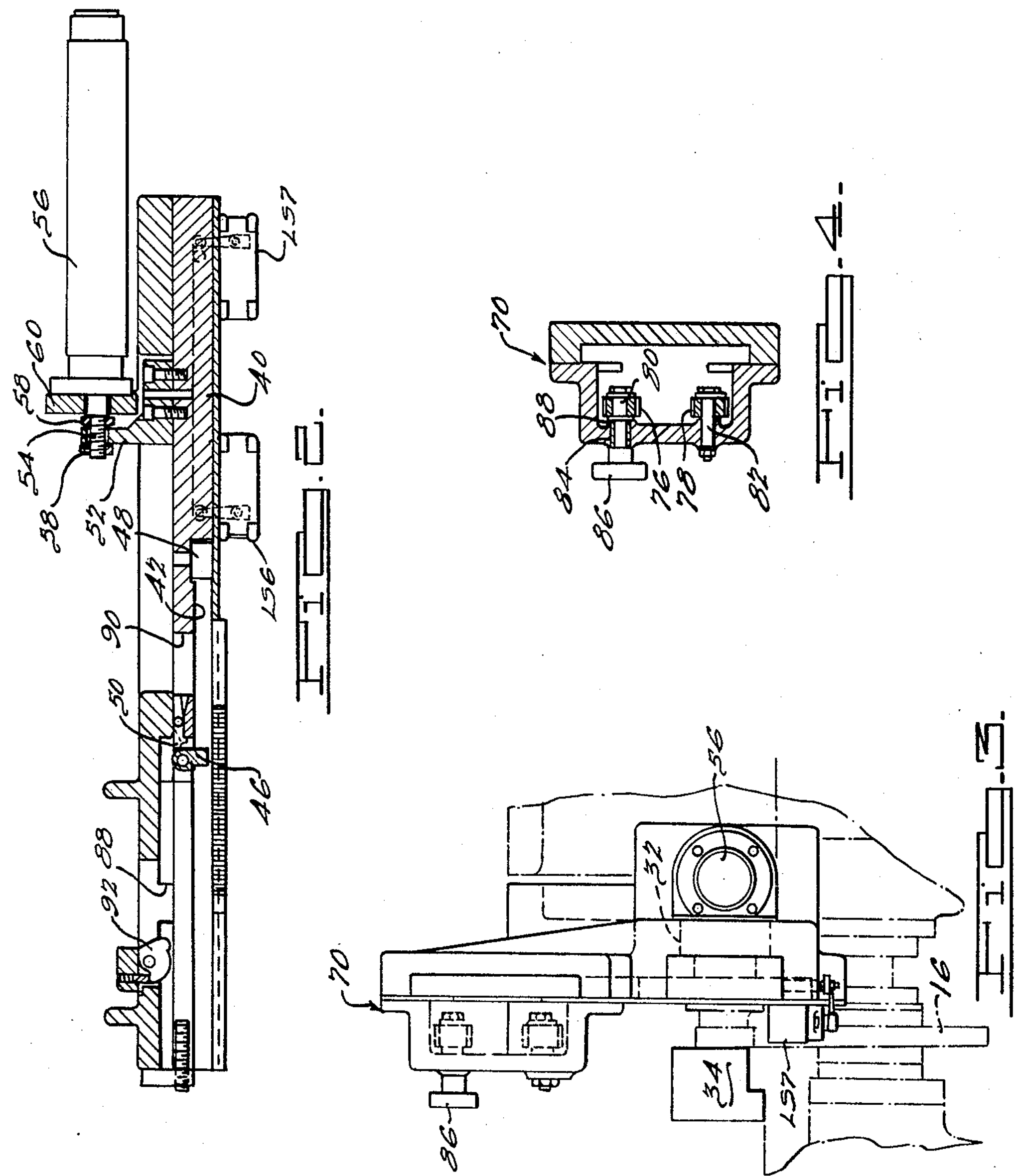
INVENTOR.
Alexander D. F. Moncrieff
BY
Harness, Dickey & Pierce
ATTORNEYS.

July 26, 1960 A. D. F. MONCRIEFF 2,946,264

LOADING MECHANISM

Filed Nov. 21, 1955 3 Sheets-Sheet 3

INVENTOR.
Alexander D.F. Moncrieff
BY
Harness, Dickey & Pierce
ATTORNEYS.

United States Patent Office 2,946,264

Patented July 26, 1960

2,946,264

LOADING MECHANISM

Alexander D. F. Moncrieff, Bloomfield Hills, Mich., assignor to Michigan Tool Company, Detroit, Mich., a corporation of Delaware Filed Nov. 21, 1955, Ser. No. 547,920

15 Claims. (Cl. 90—1.6)

This invention relates to loading mechanisms, and more particularly, to an improved loading mechanism for gear producing and gear finishing machines such as gear shaving machines and the like.

An object of the present invention is to provide an improved loading mechanism incorporating improved means for successively moving gear workpieces into meshing relationship with respect to a toothed machining element.

Another object of the invention is to provide an improved loading mechanism incorporating improved means for holding and successively transferring gear workpieces to a machining station.

Another object of the invention is to provide an improved loading mechanism incorporating improved means for releasing gear workpieces from the loading mechanism.

Another object of the invention is to provide an improved loading mechanism incorporating improved means for preventing the inadvertent loading of improperly dimensioned gear workpieces.

Another object of the invention is to increase the efficiency and the output rate of gear producing and gear finishing machines.

Another object of the invention is to provide an improved electrical control system for loading mechanisms of the indicated character.

Another object of the invention is to provide an improved loading mechanism incorporating improved means for effecting the intermeshing of gear workpieces and a toothed machining element.

Another object of the invention is to provide an improved loading mechanism for gear producing and gear finishing machines that is economical to manufacture and assemble, durable, efficient and reliable in operation.

Still another object of the invention is to reduce the labor and expense of machining gear workpieces.

The above as well as other objects and advantages of the present invention will become apparent from the following description, the appended claims and the accompanying drawings wherein:

Figure 1 is a side elevational view of one embodiment of the invention, showing the same in installed relationship with respect to a fragmentarily illustrated gear shaving machine;

Fig. 2 is a longitudinal sectional view of a portion of the structure illustrated in Figure 1, taken on the line 2—2 thereof;

Fig. 3 is an end view of a portion of the structure illustrated in Figure 1;

Fig. 4 is a transverse sectional view of a portion of the structure illustrated in Fig. 1, taken on the line 4—4 thereof.

Figure 5:
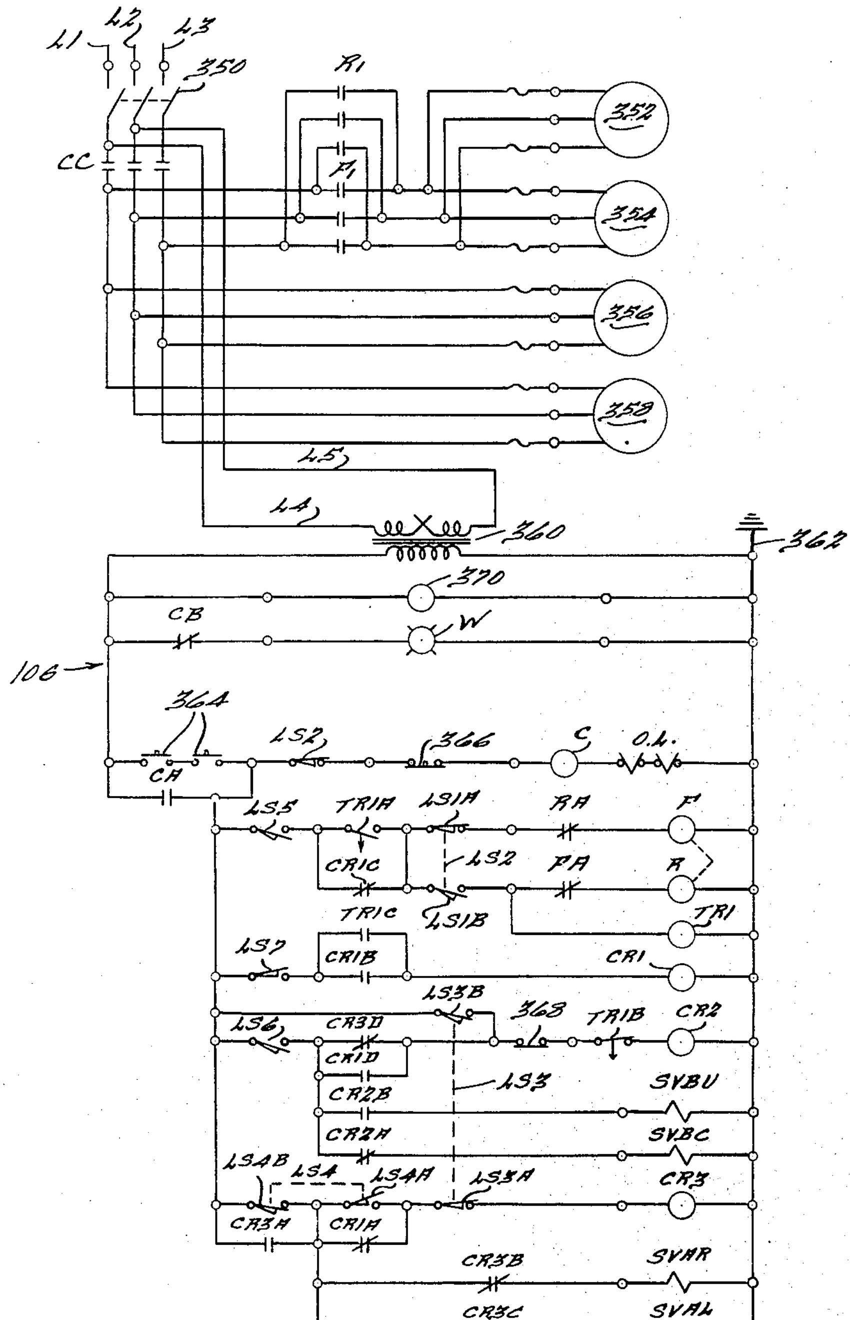
Fig. 5 is a schematic diagram of the electrical control system of the loading mechanism illustrated in Figs. 1–4.

Referring to the drawings and, more particularly, to Figure 1 thereof, a fragmentarily illustrated gear shaving machine, generally designated 10, is shown which is of conventional design. Gear shaving machines of the type illustrated include a head portion 12 and a vertical movable knee 14 which is carried by a suitable supporting structure, vertical movement of the knee being effected by a motor (not shown) housed in the knee. A toothed gear shaving element 16 is provided which is supported between a pair of spaced upwardly projecting mounting members 18 carried by the knee 14.

The gear shaving machine 10 also includes a reciprocally mounted work slide mechanism, generally designated 20, which carries the gear workpieces 22 during the shaving operation, the slide mechanism 20 being angularly adjustable so that the proper cross axes relationship between the toothed shaving element 16 and the workpieces 22 may be effected. Reciprocation of the slide mechanism 20 is accomplished by a suitable gear reduction unit powered by a conventional electrical motor (not shown) housed in the head 12, the reciprocation of the work slide mechanism 20 being controlled by a pair of limit switches LS1A and LS1B shown in Fig. 5.

A taper adjusting plate 24 is provided which is secured to the work slide mechanism 20 by T-bolts 26, the plate 24 having keys 28 for effecting proper alignment of the work supporting means relative to the toothed shaving element 16. A support member 30 is provided which is secured to the taper adjusting plate 24, a fluid actuated tailstock 32 and a head stock 34 are also provided, as shown in Fig. 3. Thus, a workpiece 22 supported by the head stock 34 and the tailstock 32 may be moved across the face of the shaving element 16 in any desired manner to effect the conventional types of shaving operations.

In accordance with the present invention, a loading mechanism, generally designated 36, is provided for successively feeding and locating relatively heavy gear workpieces in intermeshing relationship with respect to the toothed shaving element 16, so that a relatively small end portion of the workpiece may be shaved. The loading mechanism 36 includes a slide way 38 secured to the lower portion of the support member 30. A slide member 40 is provided which is mounted for reciprocation on the slide way 38, the slide member 40 defining a recess 42 adapted to receive a gear workpiece. At the bottom of the recess 42, a spring loaded shock absorber 44 is provided which cushions the fall of the relatively heavy workpieces. As shown in Figs. 1 and 2, a spring biased pivoted latch 46 is provided on one side of the recess 42 while a roller 48 is provided on the opposite side of the recess 42, the latch 46 and the roller 48 cooperating to hold the workpiece in the slide member. A trigger 50 is provided on the slide member which engages the latch 46 so as to prevent pivotal movement thereof until the trigger is released, as will be described hereinafter in greater detail. With such a construction, movement of the workpiece longitudinally of the slide member is prevented. At the same time, the workpiece is permitted to rotate about its own axis and is also permitted to move upwardly relative to the slide member, as viewed in Fig. 1.

As shown in Fig. 2, the slide member includes an outwardly projecting portion 52 which is fixed to the piston rod 54 of a fluid actuated piston and cylinder unit 56 by nuts 58, the unit 56 being carried by an outwardly projecting portion 60 of the support member 30.

A pair of limit switches LS6 and LS7 are secured to the lower portion of the slide ways 38, the limit switches LS6 and LS7 being actuated by a pin 62 fixed to the slide member 40. The limit switches LS6 and LS7 are electrically connected to solenoid valves which control the operation of the piston and cylinder unit 56 and, consequently, control the travel of the slide member 40.

An inclined feed chute 64 is provided through which the gear workpieces are supplied to the slide member 40, the chute 64 being secured to the support member 30 so that the lower end of the chute is aligned with the recess 42 when the slide member 40 is in the retracted position. The feed chute 64 includes guide ways 66 and 68 which support the workpieces for rolling movement down the chute.

As shown in Fig. 1, the chute 64 may be filled with a plurality of workpieces 22, the lowermost workpiece entering the recess 42 in the slide member 40 when the slide member is in the retracted position. As shown in Figs. 1 and 4, the upper end of the chute 64 is provided with an inspection fixture 70 which includes a pair of spaced outwardly projecting gauge blocks 72 which check the length of the workpiece, and a pair of inwardly projecting gauge blocks, such as 74 which check specified dimensions in the workpiece. The inspection fixture 70 also includes a pair of master gears 76 and 78 which are mounted on shafts 80 and 82, respectively, at the correct center distance. The shaft 82 and the master gear 78 are fixed against rotation while the shaft 80 which carries the master gear 76 is mounted in a sleeve bearing 84. A knurled knob 86 is provided which is fixed to the shaft 80 to facilitate rotation of the master gear 76. In the operation of the inspection fixture 70, the operator inserts each workpiece in the fixture so that the teeth on the workpiece mesh with the teeth of the master gears 76 and 78. The knob 86 is then turned, if necessary, to cause each workpiece to pass between the master gears, each workpiece thereby rotating in contact with the fixed gear 78. If the workpiece is undersized or correctly dimensioned, it will pass through between the gears 76 and 78. An experienced operator can detect a gear workpiece which moves through too readily and remove it as undersized. A gear workpiece which is greatly oversized, or which has incorrect tooth spacing or tooth profile either will not pass through the master gears or will pass through only with difficulty, and can be discarded. An experienced operator can sense by the force required to be exerted on the knob 86 whether to reject certain of the gears that pass through with difficulty. It will be appreciated that in a shaving machine of the type illustrated, it is necessary to protect the shaving element from workpieces which are grossly oversized or which have incorrect tooth spacing or tooth profile. It is also economical to reject grossly undersized gears before expending additional time and labor on them. It will be appreciated that, if desired, the sizing fixture can be provided with additional sets of master gears and additional sets of gauge blocks to check any desired dimensions of relatively complex workpieces.

After a workpiece has been inserted in the recess 42, the slide member 40 is advanced by the piston and cylinder unit 56 so that the workpiece is moved into meshing relationship with the shaving element 16, with the longitudinal axis of the workpiece aligned with the tailstock center. The tailstock center is adapted to pass through an opening 88 defined by the support member 30 and through an opening 90 in the slide member 40 so as to engage the workpiece. At a position adjacent the opening 88, a pivotally mounted spring biased cam 92 is provided which is engaged by the tailstock 32 when the tailstock center passes through the opening 88, the cam 92, in turn, engaging the trigger 50 so as to release the latch 46, thereby permitting the latch 46 to pivot in a clockwise direction to release the workpiece when the slide member 40 is retracted. Consequently, when the slide member 40 is retracted, the workpiece remains aligned with the opening 88 in the support member. As the slide member returns to the retracted position adjacent the lower end of the chute 64, the latch 46 pivots in a counterclockwise direction, as viewed in Fig. 2, after clearing the workpiece and is retained in the latching position by the trigger 50. When the succeeding workpieces advance into meshing relationship by the slide member 40, the preceding finished gear workpiece is ejected by the slide member 40 over the left end of the slide ways 38, as viewed in Fig. 1, into a chute, conveyor or other suitable receptacle.

As previously mentioned, the latch member 46 and the roller 48 retain the workpiece in the recess 42 so as to prevent the workpiece from moving longitudinally of the slide member 40 and, at the same time, the latch 46 and the roller 48 permit the workpiece to move upwardly in the recess 42 and to rotate about its own axis. In the event the workpiece fails to mesh with the shaving element 16 upon initial contact with the shaving element, the workpiece tends to climb on the shaving element and also rotates slightly in the recess 42. At a position above the shaving element 16, a pressure bar 94 is provided, one end portion of which is pivotally connected to the support 30 by a pivot pin 96. The opposite end of the bar 94 defines a slot 98 adapted to receive a pin 100 fixed to the support member 30. A spring 102 is provided which biases the bar 94 downwardly against the workpiece 22. When the workpiece fails to mesh with the shaving element, the workpiece climbs on the shaving element, thereby pivoting the bar 94 upwardly, as viewed in Fig. 1. The movement of the bar 94 upwardly actuates a limit switch LS3 through the agency of an actuating member 104, and the limit switch LS3, in turn, effects the retraction of the slide member 40 and the tailstock 32, as will be described hereinafter in greater detail. After the slide member 40 is retracted, it is again advanced so that the workpiece engages the shaving element. Since the workpiece was rotated slightly during its initial contact with the shaving element, the workpiece will probably mesh with the shaving element. In the event the workpiece again fails to mesh with the shaving element, the slide member 40 and the tailstock 32 continue to reciprocate until the workpiece engages the shaving element in meshing relationship.

Referring to Fig. 5, a control circuit, generally designated 106, is shown for the shaving machine and the loading mechanism illustrated in Figs. 1–4. Electrical energy is supplied to the circuit 106 from conductors L1, L2 and L3 through a main disconnect switch 350. A cutter drive motor 352, a work slide mechanism motor 354, a coolant pump motor 356 for supplying cutting fluid to the cutter, and a chip separator motor 358 are provided which are connected in parallel across the conductors L1, L2 and L3. A conventional magnetic starter C is provided having normally open contacts CC in series with the conductors L1, L2 and L3, the starter C functioning to energize the motors 352, 354, 356 and 358 simultaneously. In addition, the motors 352 and 354 are controlled by a conventional reversing starter F–R so that the shaving element and the work slide mechanism 20 may be started and reversed simultaneously, the starter F–R having contacts F1 and R1 interposed between the motors 352 and 354 and the conductors L1, L2 and L3. A transformer 360 is provided which is connected by conductors L4 and L5 to the conductors L1 and L2 intermediate the switch 350 and the contacts CC so that the transformer is energized when the switch 350 is closed. If desired, the secondary winding of the transformer may be grounded, as at 362. A start switch 364 is provided, the closure of which energizes the starter C which locks itself in through the closure of normally open contacts CA and also extinguishes a warning light W through opening of normally closed contacts CB, the starter C remaining energized until an overload or under-voltage situation occurs, or the stop switch 366 is opened. If desired, a conveyor motor 370 may be provided which is energized upon the closure of the switch 350.

Assuming that the tailstock 32 is in the retracted position and that the loading slide 40 is at the gear receiving retracted position ready to receive a fresh gear from the chute 64, closure of the start switch 364 will energize a main control relay CR3 through the contacts LS4B of the limit switch LS4, the normally closed contacts CR1A and the normally closed contacts LS3A of the limit switch LS3. The relay CR3 locks itself in through closure of the normally open contacts CR3A. At the same time, the normally closed contacts CR3B of the relay CR3 open to de-energize the loader slide return solenoid SVAR and the normally open contacts CR3C close to energize a loader slide forward solenoid SVAL. At this point, the slide 40 has received a gear workpiece from the chute 64, and the slide 40 starts to move toward the shaving element 16. The motion of the slide 40 disengages the pin 62 from the limit switch LS7 and advances the pin 62 into engagement with the limit switch LS6. Engagement of the limit switch LS6 by the pin 62 closes the limit switch LS6 to energize the tailstock in solenoid SVBC through the normally closed contacts CR2A of the relay CR2. If the gear workpiece meshes properly with the shaving element 16, the tailstock will continue to move in until the tailstock center engages the gear workpiece. If meshing does not occur, another series of operations ensues which will be more fully described hereinafter in greater detail. The advancing motion of the tailstock first effects the disengagement of the limit switch LS4 and then effects the engagement of the limit switch LS5. Disengagement of the limit switch LS4 closes the contacts LS4A and opens the contacts LS4B, this serving to maintain the energization of the relay CR3 through its contacts CR3A and also maintaining the energization of the loader forward solenoid SVAL, and the de-energization of the solenoid SVAR. Closure of the limit switch LS5 by the tailstock completes a circuit through normally closed contacts CR1C of the relay CR1, the contacts LS1A and the interlock contacts RA to energize the forward coil F of the reversing starter F–R. Shaving and the motion of the work slide mechanism 20 then commences. When the work slide mechanism 20 reaches its limit of travel, it trips the limit switch LS1 causing the contacts LS1A to open to de-energize the forward coil F. At the same time, the contacts LS1B of the limit switch LS1 close to complete a circuit to energize a timing relay TR1 and a circuit through auxiliary contacts FA to energize the reverse starter coil R. The control relay CR1 is energized through the contacts TR1C of the timer relay TR1 and the control relay CR1 locks in through closure of the contacts CR1B. The work slide mechanism 20 and the shaving element 16 then reverse for the return cut. Return of the work slide mechanism 20 trips the limit switch LS1 causing its contacts LS1A to close and the contacts LS1B to open, thereby de-energizing the reverse coil R and the timer relay TR1. The contacts TR1A of the timer relay remain closed to energize the forward coil F for a short time interval necessary to bring the motors 352 and 354 to a complete stop. When the timer relay TR1 times out, the forward motor starter F coil is de-energized by the opening of the contacts TR1A, while the contacts TR1B close to enable the energization of the control relay CR2 through CR1D contacts. A centrifugal switch 368 is also provided to delay the energization of the relay CR2 until the motors 352 and 354 are brought to a complete stop. Closure of the switch 368 then energizes the relay CR2 which opens its contacts CR2A to de-energize the tailstock in solenoid SVBC, and the contacts CR2B of the relay CR2 close to energize the tailstock out solenoid SVBU. As the tailstock retracts, it disengages the limit switch LS5 to de-energize the F–R motor starter circuit and re-engages the limit switch LS4 to de-energize the relay CR3 through the opening of the contacts LS4A. De-energization of the relay CR3 closes the contacts CR3B to energize the slide return solenoid SVAR.

The return motion of the slide 40 disengages the limit switch LS6 which de-energizes the relay CR2 and the tailstock out solenoid SVBU and engages the limit switch LS7 which opens to de-energize the relay CR1. Closure of the relay contacts CR1A of the relay CR1 re-energizes the relay CR3 and the cycle repeats. The above is the normal cycle when the gear workpiece meshes immediately on its initial contact with the shaving element.

In the event the gear workpiece fails to mesh with the shaving element when the loading slide 40 is moving forwardly, the gear workpiece will climb on the shaving element and the bar 94 will pivot upwardly to cause the actuating element 104 to engage the limit switch LS3. The contacts LS3B of the limit switch LS3 are thereby closed to re-energize the relay CR2 while the contacts LS3A open to de-energize the relay CR3. The contacts CR2B of the relay CR2 then close to energize the center out solenoid SVBU, the contacts CR3C open to de-energize the load slide forward solenoid SVAL, and the contacts CR3B close to energize the load slide return solenoid SVAR. This causes the tailstock to retract and the slide 40 to retract. The return motion of the slide 40 disengages the limit switches LS6 and LS3, the limit switch LS3, in turn, de-energizing the relay CR2 and re-energizing the relay CR3. The contacts CR3B of the relay CR3 then open to de-energize the load slide return solenoid SVAR and the contacts CR3C close to re-energize the load slide forward solenoid SVAL. This results in an immediate return of the load slide 40. If meshing occurs on the next contact with the gear workpiece with the shaving element, the disengagement of the limit switch LS7 and the re-engagement of the limit switch LS6 will occur and the cycle will continue as described hereinabove. If meshing does not occur on the second approach of the gear workpiece relative to the shaving element, the limit switch LS3 will again be engaged to cause withdrawal of the tailstock and the slide 40, and the cycle is repeated until meshing does occur.

Since the gear workpiece is free to rotate in the recess 42 in the slide 40, the workpiece will be angularly shifted by its climbing contact with the shaving element 16. This shift is usually sufficient to cause meshing during the first increment of the climbing movement of the workpiece on the shaving element. If meshing does not occur, however, the withdrawal of the slide 40 causes a further shift of the gear workpiece in the recess 42 so that on the return of the slide 40, meshing is likely to occur. Normally, one or two cycles of the slide 40 are sufficient to effect meshing of the gear workpiece and the shaving element. Furthermore, this shifting is accomplished without dragging the gear teeth of the workpiece across the teeth of the shaving element, since the gear workpiece is free to rotate in the recess 42.

While a preferred embodiment of the invention has been shown and described, it will be understood that various changes and modifications may be made without departing from the spirit of the invention.

What is claimed is:

1. In a loading mechanism for gear finishing machines and the like having a toothed machining element, the combination comprising a slide way, a slide member mounted for reciprocation on said slide way and defining a recess adapted to receive a portion of a workpiece, said slide member being actuable to move a workpiece carried thereby into contact with said element, means for releasably retaining a workpiece in said recess and permitting said workpiece to move in a predetermined direction relative to said slide member, means for reciprocating said slide member, and means responsive to the movement of a workpiece in said recess for actuating said reciprocating means.

2. In a loading mechanism for gear finishing machines and the like having a toothed machining element, the combination comprising a slide way, a slide member mounted for reciprocation on said slide way and defining a recess adapted to receive a portion of a workpiece, said slide member being actuable to move a workpiece carried thereby into contact with said element, means for releasably retaining a workpiece in said recess and permitting the workpiece to move in a predetermined direction, means for releasing said retaining means, means for inserting workpieces successively into said recess, means for reciprocating said slide member, and means responsive to the movement of a workpiece in said recess for actuating said reciprocating means.

3. In a loading mechanism for gear finishing machines and the like having a toothed machining element and a workpiece center support movable between a holding position and a retracted position, the combination comprising a slide member defining a recess adapted to receive a workpiece whereby at least a portion of the periphery of the workpiece terminates in outwardly spaced relationship with respect to the slide member, said slide member being actuable to move a workpiece carried thereby into contact with said element, means for successively inserting workpieces into said recess, means for moving said slide member toward and away from said machining element, means for retaining a workpiece in said recess and permitting said workpiece to move angularly relative to said machining element upon failure of said workpiece to mesh with said machining element upon contact therewith, and means responsive to movement of said center support to its holding position for releasing said retaining means.

4. In a loading mechanism for gear finishing machines and the like having a toothed machining element, the combination comprising a slide member defining a recess adapted to receive a workpiece whereby at least a portion of the periphery of the workpiece terminates in outwardly spaced relationship with respect to said slide member, said slide member being actuable to move a workpiece carried thereby into contact with said element, means for retaining a workpiece in said recess and permitting the workpiece to move angularly relative to said machining element upon failure of said workpiece to mesh with said machining element upon contact therewith, means for successively feeding workpieces to said slide member, means for moving said slide member toward and away from said machining element, and means responsive to movement of a workpiece in said recess for actuating said slide member.

5. In a loading mechanism for gear finishing machines and the like having a toothed machining element, the combination comprising a slide member defining a recess adapted to receive a portion of a workpiece whereby the periphery of another portion of the workpiece terminates in outwardly spaced relationship with respect to the slide member, said slide member being actuable to move a workpiece carried thereby into contact with said element, means for successively feeding workpieces to said slide member, cushion means in said recess engageable with a workpiece when a workpiece is inserted in said recess, means releasably retaining a workpiece in said recess and permitting the workpiece to move in a predetermined direction relative to said slide member upon failure of said workpiece to mesh with said machining element upon contact therewith, means for moving said slide member toward and away from said machining element, and means responsive to the movement of a workpiece in said recess for actuating said slide member.

6. In combination with a gear finishing machine having a toothed machining element, a loading mechanism including a slide member defining a recess open on the upper side thereof, said slide member being mounted for reciprocating movement toward and away from said machining element and being actuable to move a workpiece carried thereby into contact with said element, means for successively transferring workpieces into said recess, means for moving said slide member toward and away from said machining element, and means responsive to upward movement of a workpiece in said recess upon failure of said workpiece to mesh with said machining element upon contact therewith for actuating said slide member.

7. In a loading mechanism for gear finishing machines and the like having a toothed machining element, the combination including means for successively delivering a plurality of workpieces to a loading station, a slide member mounted for reciprocating movement between said loading station and said machining element, said slide member being actuable to move a workpiece carried thereby into contact with said element, reciprocating means for successively transferring workpieces from said loading station to said slide member, means releasably securing said workpieces to said slide member and permitting the workpiece to move in a predetermined direction relative to said slide member upon failure of said workpiece to mesh with said machining element upon contact therewith, means for reciprocating said slide member, and means including electroresponsive means responsive to the movement of a workpiece relative to said slide member for actuating said slide member.

8. In a loading mechanism for gear finishing machines and the like having a toothed machining element, the combination including a slide member actuable to move a gear workpiece carried thereby into contact with said element, a feed chute adapted to deliver workpieces successively to a loading station, said slide member being mounted for reciprocating movement between said loading station and said machining element and adapted to retain a workpiece whereby at least a portion of the periphery of the workpiece terminates in outwardly spaced relationship with respect to the slide member, fluid actuated means for successively transferring said workpieces from said loading station to said slide member, means on said slide member for releasably retaining said workpieces and permitting said workpieces to move in a predetermined direction relative to said slide member upon failure of said workpiece to mesh with said machining element upon contact therewith, means for advancing said slide member toward said machining element, and means responsive to the movement of a workpiece relative to said slide member for retracting said slide member.

9. In combination with a gear finishing machine having a reciprocable workpiece supporting element and a toothed machining element, means including a loading member for successively moving gear workpieces into contact with said elements, an electrical control circuit operatively associated with said elements and said loading member, said control circuit being effective to actuate said supporting element and said loading member, and means in said control circuit effective to retract said supporting element and said loading member upon failure of a gear workpiece carried by said loading member to mesh with said machining element upon contact therewith.

10. In an electrical control system for controlling a gear finishing machine having a movable workpiece supporting member and a toothed machining element, a source of electrical potential, a first electrical circuit arranged to be energized from said source and controlling the movement of said member, a second electrical circuit, electrical switch means in said second circuit actuable upon the failure of a workpiece to mesh with said element upon contact therewith and controlling energy flow through said second circuit, and means including electroresponsive means in said second circuit controlling the energization of said first circuit.

11. In an electrical control system for controlling a gear finishing machine having a movable workpiece supporting member and a toothed machining element, a source of electrical potential, a first electrical circuit arranged to be energized from said source and controlling the movement of said member, a second electrical circuit, electrical switch means in said second circuit actuable upon the failure of a workpiece to mesh with said element upon contact therewith and controlling energy flow through said second circuit, current flow responsive means associated with said second circuit and responsive to current flow in said second circuit, and means including a pair of contacts in said first circuit controlled by said current flow responsive means for controlling the energization of said first circuit.

12. In an electrical control system for controlling a gear finishing machine having a movable workpiece supporting member and a toothed machining element, a source of electrical potential, a first electrical circuit arranged to be energized from said source and controlling the movement of said member, a second electrical circuit, electric switch means in said second circuit actuatable upon the failure of a workpiece to mesh with said element upon contact therewith and controlling energy flow through said second circuit, and means including relay means in said second circuit responsive to current flow in said second circuit for controlling the energization of said first circuit.

13. In an electrical control system for controlling a gear finishing machine having a movable workpiece supporting member and a toothed machining element, a source of electrical potential, a first electrical circuit arranged to be energized from said source and controlling the movement of said member, a second electrical circuit, current flow responsive means associated with said second circuit and actuating a pair of electrical contacts, said flow responsive means acting in response to current flow in said second circuit to actuate said contacts, said contacts being effective to control the energization of said first circuit, and current modulating means in said second circuit actuable upon the failure of a workpiece to mesh with said element upon contact therewith and controlling energy flow through said second circuit.

14. In combination with a gear finishing machine having a toothed machining element, a slide member adapted to releasably retain a gear workpiece, said slide member being movable between an advanced position in which such workpiece is in contact with said machining element, and a retracted position, actuating means connected to said slide member for moving the slide member between said positions, and an electrical network including means responsive to the movement of said gear workpiece in a predetermined direction relative to said slide member upon failure of said workpiece to mesh with said machining element upon contact therewith for causing said actuating means to move the slide member from its advanced to its retracted position.

15. In combination with a gear producing machine for a toothed machining element and a workpiece center support movable between a holding position and a retracted position, loading means for moving said gear workpieces successively into contact with said machining element, said loading means being movable between an advanced position in which a workpiece is in contact with said machining element and a retracted position in which such workpiece is withdrawn from said element, and electrical control means actuatable upon the failure of a gear workpiece to mesh with said element upon contact therewith to cause said center support and said loading means to move to their retracted positions.

References Cited in the file of this patent

UNITED STATES PATENTS

| | | |
|---|---|---|
| 2,649,032 | Moncrieff | Aug. 18, 1953 |
| 2,692,535 | Praeg | Oct. 26, 1954 |
| 2,692,536 | Gates | Oct. 26, 1954 |
| 2,693,133 | Moncrieff | Nov. 2, 1954 |
| 2,733,641 | Praeg | Feb. 7, 1956 |